(12) United States Patent
Graham et al.

(10) Patent No.: US 10,169,178 B2
(45) Date of Patent: *Jan. 1, 2019

(54) IMPLEMENTING SHARED ADAPTER CONFIGURATION UPDATES CONCURRENT WITH MAINTENANCE ACTIONS IN A VIRTUALIZED SYSTEM

(71) Applicant: International Business Machines Corporation, Armonk, NY (US)

(72) Inventors: Charles S. Graham, Rochester, MN (US); John R. Oberly, III, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 167 days.

This patent is subject to a terminal disclaimer.

(21) Appl. No.: 15/049,062

(22) Filed: Feb. 20, 2016

(65) Prior Publication Data

US 2016/0170855 A1 Jun. 16, 2016

Related U.S. Application Data

(63) Continuation of application No. 13/915,966, filed on Jun. 12, 2013, now Pat. No. 9,323,620.

(51) Int. Cl.
*G06F 11/00* (2006.01)
*G06F 11/22* (2006.01)
(Continued)

(52) U.S. Cl.
CPC ...... *G06F 11/2289* (2013.01); *G06F 9/44505* (2013.01); *G06F 9/45558* (2013.01);
(Continued)

(58) Field of Classification Search
CPC ............ G06F 11/2289; G06F 11/0793; G06F 11/142; G06F 11/1415; G06F 9/45558;
(Continued)

(56) References Cited

U.S. PATENT DOCUMENTS

| 5,875,310 A | 2/1999 | Buckland et al. |
| 6,122,289 A | 9/2000 | Brown et al. |

(Continued)

FOREIGN PATENT DOCUMENTS

EP 1130501 A1 9/2001

OTHER PUBLICATIONS

Netronome; "Standardized but Flexible I/O for Self-Virtualizing Devices"; WIOV'08 Proceedings of the First Conference on I/O Virtualization; p. 9-9; 2008.

(Continued)

*Primary Examiner* — Yair Leibovich
(74) *Attorney, Agent, or Firm* — Joan Pennington

(57) ABSTRACT

A method, system and computer program product are provided for implementing shared adapter configuration updates concurrent with maintenance actions for a Single Root Input/Output Virtualization (SRIOV) adapter in a computer system. A configuration of the adapter is decoupled from the state of the adapter during a recovery period. When a configuration request is received, the configuration request is validated. Responsive to a valid configuration request, the saved configuration state of the adapter is updated. Once the adapter completes recovery, the adapter is restored to the new configuration instead of the configuration prior to failure.

13 Claims, 4 Drawing Sheets

(51) Int. Cl.
*G06F 11/14* (2006.01)
*G06F 9/445* (2018.01)
*G06F 9/455* (2018.01)
*G06F 11/07* (2006.01)

(52) U.S. Cl.
CPC ........ *G06F 11/0793* (2013.01); *G06F 11/142* (2013.01); *G06F 11/1415* (2013.01); *G06F 2009/45579* (2013.01); *G06F 2201/815* (2013.01)

(58) Field of Classification Search
CPC ....... G06F 9/44505; G06F 2009/45579; G06F 2201/815
USPC .......................................................... 714/43
See application file for complete search history.

(56) References Cited

U.S. PATENT DOCUMENTS

| | | | |
|---|---|---|---|
| 6,311,326 | B1 | 10/2001 | Shagam |
| 7,231,493 | B2 | 6/2007 | Nguyen et al. |
| 7,757,129 | B2 | 7/2010 | Bohizic et al. |
| 7,770,073 | B2 | 8/2010 | Fashchik et al. |
| 8,141,092 | B2 | 3/2012 | Brown et al. |
| 8,261,242 | B2 | 9/2012 | Booth et al. |
| 8,358,661 | B2 | 1/2013 | Armstrong et al. |
| 8,359,415 | B2 | 1/2013 | Brown et al. |
| 8,375,363 | B2 | 2/2013 | Zhou et al. |
| 8,418,166 | B2 | 4/2013 | Armstrong et al. |
| 8,447,891 | B2 | 5/2013 | Brownlow et al. |
| 9,111,046 | B2 | 8/2015 | Anderson et al. |
| 9,135,101 | B2 | 9/2015 | Prabhakraran et al. |
| 9,317,317 | B2* | 4/2016 | Graham .............. G06F 9/45558 |
| 9,323,620 | B2* | 4/2016 | Graham .............. G06F 11/1415 |
| 2002/0161907 | A1 | 10/2002 | Moon |
| 2002/0198967 | A1* | 12/2002 | Iwanojko ............ H04L 41/0816 709/220 |
| 2003/0037275 | A1* | 2/2003 | Bakke ................ G06F 11/2089 714/4.3 |
| 2003/0172325 | A1* | 9/2003 | Wyatt ..................... G06F 11/10 714/53 |
| 2004/0019670 | A1* | 1/2004 | Viswanath .......... H04L 41/0253 709/223 |
| 2004/0049710 | A1 | 3/2004 | Ashmore et al. |
| 2001/0260981 | A1 | 12/2004 | Kitamom et al. |
| 2004/0260981 | A1 | 12/2004 | Kitamom et al. |
| 2008/0147904 | A1 | 6/2008 | Freimuth et al. |
| 2009/0037904 | A1 | 2/2009 | Cohen et al. |
| 2009/0133028 | A1 | 5/2009 | Brown et al. |
| 2009/0144731 | A1 | 6/2009 | Brown et al. |
| 2009/0178033 | A1 | 7/2009 | Challener et al. |
| 2009/0313391 | A1 | 12/2009 | Watanabe |
| 2010/0115049 | A1 | 5/2010 | Matsunaga et al. |
| 2010/0146170 | A1 | 6/2010 | Brown et al. |
| 2011/0040860 | A1 | 2/2011 | DuCusatis et al. |
| 2012/0102490 | A1 | 4/2012 | Edie et al. |
| 2012/0124572 | A1 | 5/2012 | Cunningham et al. |
| 2012/0137288 | A1* | 5/2012 | Barrett ................ G06F 9/45558 718/1 |
| 2012/0151472 | A1 | 6/2012 | Koch et al. |
| 2012/0159245 | A1 | 6/2012 | Brownlow et al. |
| 2012/0179932 | A1 | 7/2012 | Armstrong et al. |
| 2012/0180047 | A1 | 7/2012 | Cardona et al. |
| 2012/0180048 | A1 | 7/2012 | Brownlow et al. |
| 2012/0185632 | A1 | 7/2012 | Lais et al. |
| 2012/0246644 | A1 | 9/2012 | Hattori et al. |
| 2012/0254862 | A1 | 10/2012 | Dong et al. |
| 2012/0297379 | A1 | 11/2012 | Anderson et al. |
| 2012/0311597 | A1* | 12/2012 | Manula ................ G06F 9/5077 718/104 |
| 2012/0317548 | A1 | 12/2012 | Olsa et al. |
| 2013/0054507 | A1 | 2/2013 | Das et al. |
| 2013/0275972 | A1 | 10/2013 | Sawa et al. |
| 2014/0250338 | A1 | 9/2014 | Prabhakaran et al. |
| 2015/0324217 | A1* | 11/2015 | Shilmover .......... G06F 9/45558 718/1 |
| 2017/0286354 | A1* | 10/2017 | Feehrer ............... G06F 13/4282 |

OTHER PUBLICATIONS

Broadcom; "Broadcom Ethernet Network Controller Enhanced Virtualization Functionality"; http://www.broadcom.com/press/release.php?id=1197764; White Paper; Oct. 2009.
Challa, NR.; "Hardware Based I/O Virtualization Technologies for Hypervisors, Configurations, and Advantages—A Study"; Proceedings of the 2012 IEEE International Conference on Cloud Computing in Emerging Markets (CCEM), 5 pp.; IEEE; 2012.
Charles S. Graham et al. U.S. Appl. No. 13/915,887, filed Jun. 12, 2013, entitled "Implementing Distributed Debug Data Collection and Analysis for a Shared Adapter in a Virtualized System".
Gary D. Anderson et al. U.S. Appl. No. 13/915,903, filed Jun. 12, 2013 entitled "Implementing Capacity and User-Based Resource Allocation for a Shared Adapter in a Virtualized System".
Jesse P. Arroyo et al. U.S. Appl. No. 13/915,943, filed Jun. 12, 2013 entitled "Implementing Enhanced Error Handling of a Shared Adapter in a Virtualized System".
Charles S. Graham et al. U.S. Appl. No. 13/915,966, filed Jun. 12, 2013, entitled "Implementing Shared Adapter Configuration Updates Concurrent With Maintenance Actions in a Virtualized System".
Charles S. Graham et al. U.S. Appl. No. 13/915,737, filed Jun. 12, 2013, entitled "Implementing Concurrent Device Driver Maintenance and Recovery for an SRIOV Adapter in a Virtualized System".
Kirk Glerum et al., "Debugging in the (Very) Large: Ten Years of Implementation and Experience", Microsoft Corporation, 2009.
Nithya Ramanathan et al., "Sympathy for the Sensor Network Debugger", UCLA Center for Embedded Network Sensing, 2005.
Bhosale, Shivaji D. et al. "IBM Power Systens SR-IOV Technical Overview and Introduction", REDP-5065-00. International Business Machines Corporation, May 20, 2014, pp. 1-71.
Ko, Mike et al., "Virtual Ethernet Bridging", International Business Machines Corporation,Jul. 2008, pp. 1-11.
Power 7 Information, Virtualizing Power Systems Servers, International Business Machines Corporation, Apr. 29, 2014.
Emulex, "Single Root I/O Virtualization (SR-IOV)", Vdrsion 3.1 User's Guide, P007978-O1A Rev. A, 2012, pp. 1-5.
Varma, Anujan, "Single Root IOV Endpoint Implementation", PCI-SIG Developers Conference 2007, PCI-SIG, May 21, 2007, pp. 1-36.
International Search Report and Written Opinion of the ISA dated Jul. 8, 2014—Internatoional Application No. PCT/JP2014/002914.

\* cited by examiner

IMPLEMENTING SHARED ADAPTER CONFIGURATION UPDATES CONCURRENT WITH MAINTENANCE ACTIONS IN A VIRTUALIZED SYSTEM

This application is a continuation application of Ser. No. 13/915,966 filed Jun. 12, 2013.

FIELD OF THE INVENTION

The present invention relates generally to the data processing field, and more particularly, relates to a method, system and computer program product for implementing shared adapter configuration updates concurrent with maintenance actions, such as in a Single Root Input/Output Virtualization (SRIOV) adapter, in a virtualized system.

DESCRIPTION OF THE RELATED ART

Single root input/output (TO) virtualization (SRIOV) is a PCI standard, providing an adapter technology building block for I/O virtualization within the PCI-Express (PCIe) industry. SRIOV capability is a feature of many new PCIe adapters for Fibre Channel, Ethernet, Infiniband, and Converged Network Adapters (CNA).

The SRIOV adapter has an I/O adapter virtualization architecture that allows a single I/O adapter to be concurrently shared across many different logical partitions. The sharing is done at a physical level, so that each logical partition has access to a slice of the physical adapter. The sharing is accomplished via partitioning the adapter into many different PCI functions, and then distributing access to those functions. The adapter is presented as one or more physical functions (PFs) that control functions, for example used for both configuration and I/O, and a set of virtual functions (VFs), used for I/O and limited configuration, each VF represents a slice of the adapter capacity that can be assigned to a logical partition independently of other VFs. Each logical partition has a device driver for each of the VFs assigned to the logical partition.

The assignment of a VF to a partition and the configuration of that VF is initiated by the Hardware Management Console (HMC). The configuration of the VF is managed by the adapter driver within the hypervisor. The adapter driver then configures the VF. This includes actions limited in scope to the hypervisor, and also actions that change settings within the adapter. Once the adapter driver completes it returns an indication of the success or failure of the configuration request back to the HMC.

However, the adapter device driver may also currently be performing other maintenance or error recovery to the adapter. These actions are potentially lengthy, such as minutes, and it is unacceptable for the configuration request to take this long. A solution is required to complete the configuration request concurrently with the error recovery process.

Other solutions typically have a static adapter configuration. This prevents the problem at the cost of requiring each VF to be statically configured, usually with adapter resources divided equally among the VFs. However, a more dynamic configuration is desired so a new solution is needed.

A need exists for an effective mechanism to enable implementing shared adapter configuration updates concurrent with maintenance actions for a Single Root Input/Output Virtualization (SRIOV) adapter in a virtualized system.

SUMMARY OF THE INVENTION

Principal aspects of the present invention are to provide a method, system and computer program product for implementing shared adapter configuration updates with maintenance actions for a Single Root Input/Output Virtualization (SRIOV) adapter. Other important aspects of the present invention are to provide such method, system and computer program product substantially without negative effects and that overcome many of the disadvantages of prior art arrangements.

In brief, a method, system and computer program product are provided for implementing shared adapter configuration updates concurrent with maintenance actions for a Single Root Input/Output Virtualization (SRIOV) adapter in a computer system. A configuration of the adapter is decoupled from the state of the adapter during a recovery period. When a configuration request is received, the configuration request is validated. Responsive to a valid configuration request, the saved configuration state of the adapter is updated. Once the adapter completes recovery, the adapter is restored to the new configuration instead of the configuration prior to failure.

In accordance with features of the invention, responsive to receiving a configuration request, the received configuration request is validated without sending the received configuration request to the I/O adapter.

In accordance with features of the invention, the configuration request optionally includes a request to provision a new resource, such as assign an additional VF to a partition, de-provision a resource, or change an existing resource, such as change resource levels or configuration of a VF. When error recovery is not in process, this request would both update the adapter configuration and may also provide a notification to the partition of the new resources. When error recovery is currently in process the adapter configuration is not immediately be updated, and the saved configuration instead is updated.

In accordance with features of the invention, when a recoverable I/O error occurs during the operation or error recovery is in progress, the configuration change still is saved with the error recovery process temporarily preventing the VF driver from using the VF. The new configuration for the VF simply is effected in the adapter prior to giving access to the VF back to the VF device driver, preventing any locked resource conflicts.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing concurrent shared adapter configuration updates with maintenance actions for a Single Root Input/Output Virtualization (SRIOV) adapter in a computer system.

Figure 1:
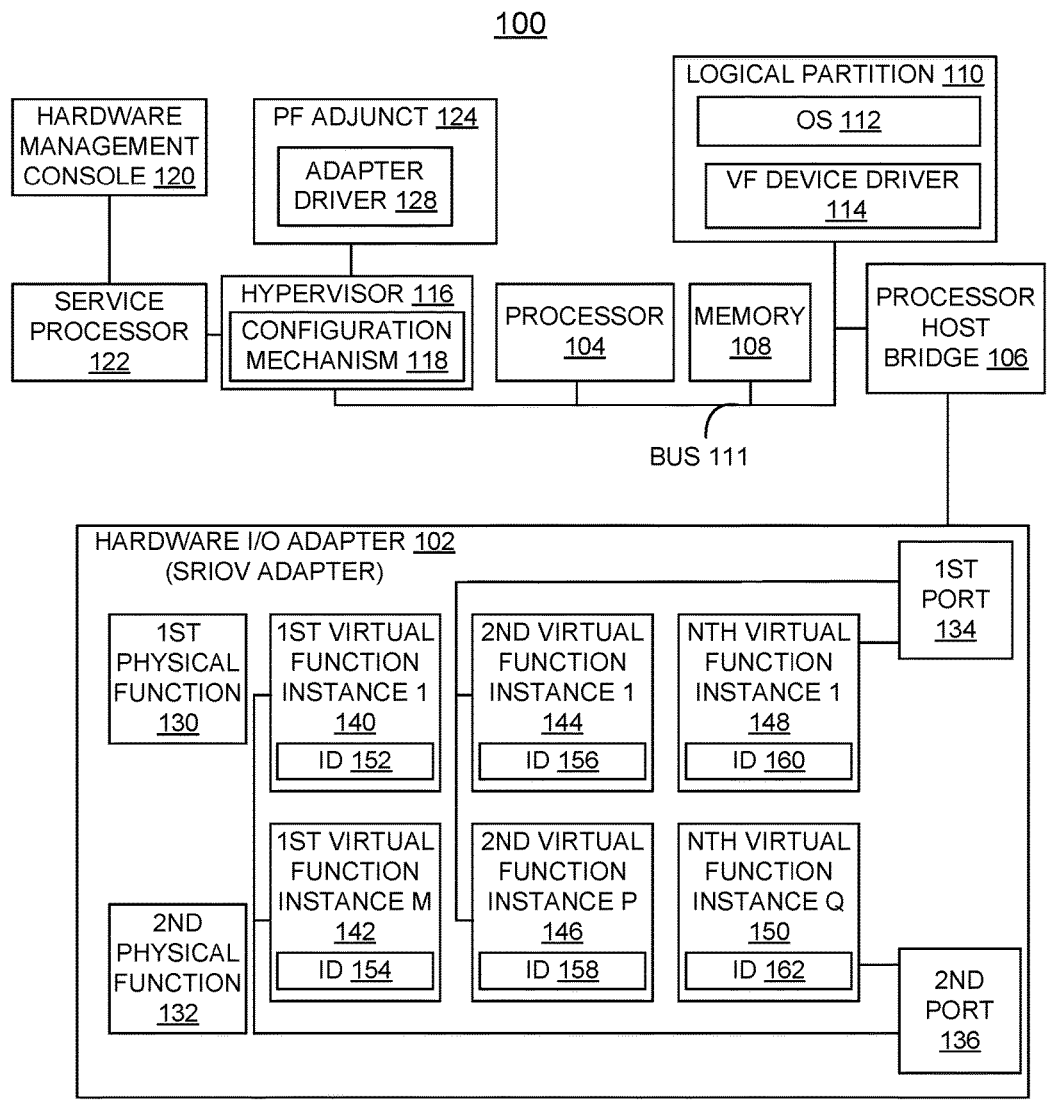
FIGS. 1, and 2 illustrates a respective example computer system and example system for implementing concurrent shared adapter configuration updates with maintenance actions for a Single Root Input/Output Virtualization (SRIOV) adapter in accordance with the preferred embodiment.

Having reference now to the drawings, in FIG. 1, there is shown an example computer system generally designated by the reference character 100 for implementing concurrent shared adapter configuration updates with maintenance actions for a Single Root Input/Output Virtualization (SRIOV) adapter 102 in accordance with the preferred embodiment. Computer system 100 includes one or more processors 104, or central processor units (CPUs) 104 (one shown) coupled by an I/O hub or processor host bridge 106 to the Single Root Input/Output Virtualization (SRIOV) adapter or hardware I/O adapter 102.

Computer system 100 includes a memory 108 and one or more logical partitions (LPARs) 110 (one shown) coupled by a system bus 111 to the processor 104 and the processor host bridge 106. Each operating system (OS) 112 resides in its own LPAR 110, with each LPAR allocated a part of a physical processor 104, an entire physical processor, or multiple physical processors from the computer 100. A VF device driver 114 is provided with the logical partition (LPAR) 110. A portion of the memory 108 is allocated to each LPAR 110. Computer system 100 includes a hypervisor 116 including a configuration mechanism 118. The hypervisor 116 is a part of the system firmware and manages the allocation of resources to each operating system 112 and LPAR 110.

As shown, a hardware management console (HMC) 120 used, for example, to manage system functions including logical partition configuration and hardware virtualization, is coupled to the hypervisor 116 via a service processor 122. Computer system 100 includes a physical function (PF) manager or PF adjunct 124 provided with the hypervisor 116. The PF adjunct 124 includes an adapter driver 128 to manage physical functions of the hardware I/O adapter 102. The hypervisor 116 uses the PF adjunct 124, for example, to configure physical functions (PFs) and virtual functions (VFs) of the hardware I/O adapter 102 based on configuration information provided by a system administrator via the hardware management console 120.

As shown, the hardware I/O adapter 102 includes, for example, a first physical function 130, a second physical function 132, a first port 134, and a second port 136. The hypervisor 116 using the PF adjunct 124 configures virtual functions based on the physical functions 130, 132 and associates virtual functions with one or more of the ports 134, 136 of the hardware I/O adapter 102.

For example, a first virtual function, 140, instance 1, and the Mth instance of the first virtual function 142, where M is greater than 1, are associated with the second port 136. As shown, a second virtual function 144, such as the first instance of the second virtual function 144 and the Pth instance of the second virtual function 146, where P is greater than 1, are associated with the first port 134. As shown, multiple instances of an Nth virtual function, where N is greater than 2, such as the first instance of the Nth virtual function 148 is associated with the first port 134 and the Qth instance of the Nth virtual function 150, where Q is greater than 1, is associated with the second port 136.

Each instance of the first virtual function 140, 142, the second virtual function 144, 146, and Nth virtual function 148, 150 are hosted by a physical function, such as one of the first physical function 132, the second physical function 132, and another physical function (not shown).

Each instance of the first virtual function 140, 142, the second virtual function 144, 146, and Nth virtual function 148, 150 includes a respective virtual function identifier (ID), shown as ID 152, ID 154, ID 156, ID 158, ID 160, and ID 162. Each virtual function identifier uniquely identifies a particular virtual function that is hosted by the hardware I/O adapter 102. For example, when a message (not shown) is routed to a particular virtual function, the message includes the identifier associated with the particular virtual function.

Computer system 100 is shown in simplified form sufficient for understanding the present invention. The illustrated computer system 100 is not intended to imply architectural or functional limitations. The present invention can be used with various hardware implementations and systems and various other internal hardware devices.

Figure 2:
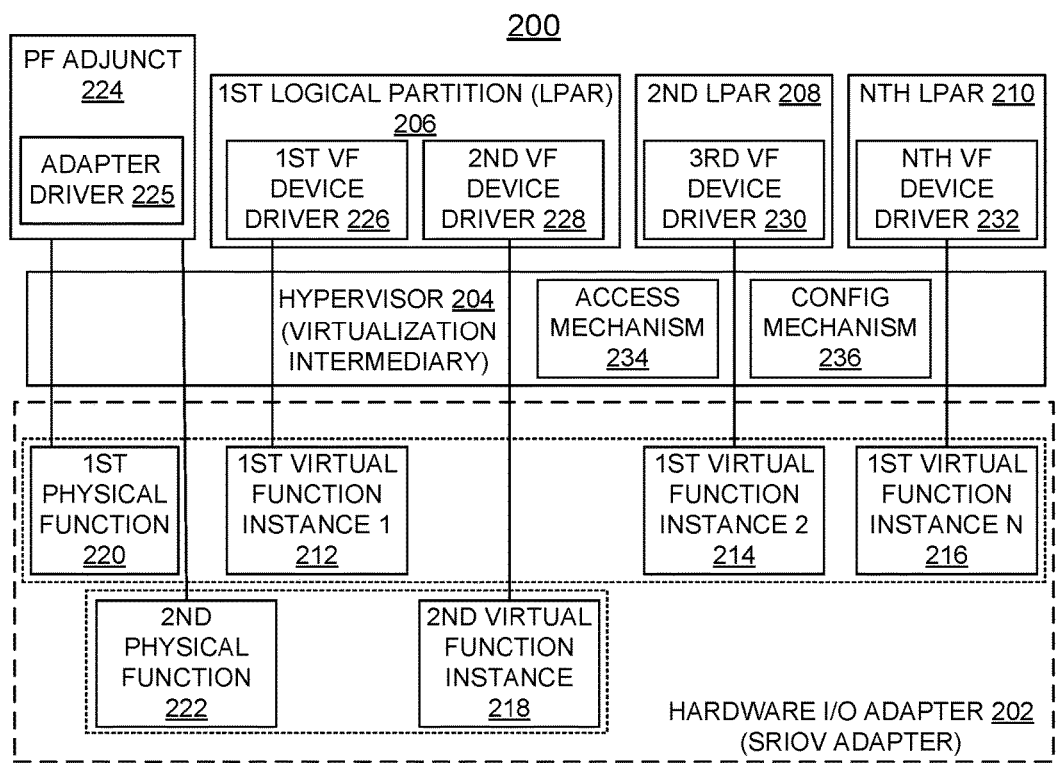

Referring to FIG. 2, there is shown another example system generally designated by the reference character 200 for implementing concurrent shared adapter configuration updates with maintenance actions for a hardware I/O adapter or Single Root Input/Output Virtualization (SRIOV) adapter or hardware I/O adapter 202 in accordance with the preferred embodiment.

System 200 includes a hypervisor 204 or other virtualization intermediary, used to enable multiple logical partitions to access virtual functions provided by hardware that includes the hardware I/O adapter 202. For example, as shown in FIG. 2, the hypervisor 204 is used to enable a first logical partition 206, a second logical partition 208, and an Nth logical partition 210, to access a plurality of virtual functions 212, 214, 216, 218 that are provided by the hardware I/O adapter 202. For example, the hypervisor 204 used a first physical function 220 of the hardware I/O adapter 202 to provide a first instance of a first virtual function 212, a second instance of a first virtual function 214, and an Nth instance of a first virtual function 216 to the logical partitions 206, 208, 210. As shown the hypervisor 204 uses a second physical function 222 of the hardware I/O adapter 202 to provide a second virtual function 218 to the logical partitions 206, 208, 210.

The physical functions 220, 222 advantageously include PCI functions, supporting single root I/O virtualization capabilities. Each of the virtual functions 212, 214, 216, 218 is associated with one of the physical functions 220, 222 and adapted to share one or more physical resources of the hardware I/O adapter 202.

Software functions or modules, such as a physical function (PF) adjunct 224 including an adapter driver 225, is provided with the hypervisor 204 for managing the physical functions 220, 222 and the virtual functions 212, 214, 216, 218. For example, a user may specify a particular configuration and the hypervisor 204 uses the PF adjunct 224 to configure the virtual functions 212, 214, 216, 218 from the physical functions 220, 222.

For example, in operation, the hypervisor 204 with the PF adjunct 224 enables the first virtual function instances 212, 214, 216 from the first physical function 220. The hypervisor 204 with the PF adjunct 224 enables the second virtual function 218 from the second physical function 222. The virtual functions 212, 214, 216, 218 are enabled, for example, based on a user provided configuration. Each of the logical partitions 206, 208, 210 may execute an operating system (not shown) and client applications (not shown).

As shown, the client applications that execute at the logical partitions 206, 208, 210 perform virtual input/output operations and include a respective device driver to directly manage an associated virtual function. For example, a first client application executing at the first logical partition 206 may include a first client VF device driver 226, and a second client application executing at the first logical partition 206 may include a second client VF device driver 228.

As shown, the first client VF device driver 226 accesses the first instance of the first virtual function 212. The second client virtual VF device driver 228 accesses the second virtual function 218. A third client VF device driver 230 executing at the second logical partition 208 accesses the second instance of the first virtual function 214. An Nth client VF device driver 232 executing at the Nth logical partition 210 accesses the Nth instance of the first virtual function 216. An access mechanism 234 and a configuration mechanism 236 are provided with the hypervisor 204 to associate a logical partition with an accessed virtual function. The hypervisor 204 uses the access mechanism 234 to enable logical partitions, such as LPAR 206 to access configuration space associated with one or more of the virtual functions 212, 214, 216, 218.

System 200 is shown in simplified form sufficient for understanding the present invention. The illustrated system 200 is not intended to imply architectural or functional limitations. The present invention can be used with various hardware implementations and systems and various other internal hardware devices.

In accordance with features of the invention, a new configuration request can arrive during the execution of this error recovery sequence. The new request might be to provision a new resource, such as assign an additional VF to a partition, de-provision a resource, or change an existing resource, for example change resource levels or configuration of a VF. If error recovery was not in process, this request would both update the adapter configuration and may also provide a notification to the partition of the new resources. However, if error recovery is currently in process the adapter cannot immediately be updated.

In accordance with features of the invention, while the adapter cannot immediately be updated when error recovery is currently in process, the saved configuration instead is updated. The saved updated configuration is the configuration information that is replayed to the adapter once error recovery completes. The key caveat here is that it must be known whether or not the configuration request is valid. Once a successful response has been returned back to the HMC there is not another point at which to return an indication of a failed request. A successful response is then immediately returned back to the configuration request. The rest of the system sees the new, or changed, resource immediately; however, it is currently in the recovery mode. This is an equivalent situation to a failure which occurs immediately after a successful configuration request.

In accordance with features of the invention, one of the key parts of the adapter driver boot process is collecting all resource limits and hardware capabilities necessary to validate configuration while the adapter is inaccessible. Specifically the collected resource limits and hardware capabilities necessary to validate configuration may include, but is not limited to numbers of ports and VFs per port and protocol and VF hardware settings/capabilities for each protocol. There also may be certain cases for dynamic configuration changes of specific parameters, the decision on whether or not the change of some setting or capability will work may need to be deferred until the driver can attempt the change in the adapter. This is required if some adapter resources for a VF are locked by an active VF driver. If the adapter is available, when no error or recovery is in progress, and the adapter rejects the change operation, the failure must be reported back to the client. If a recoverable I/O error occurs during the operation or error recovery is in progress, the configuration change can still be saved since the Enhanced Error Handling (EEH) recovery process temporarily prevents the VF driver from using the VF. The new configuration for the VF will be simply effected in the adapter prior to giving access to the VF back to the VF device driver, preventing any locked resource conflicts.

Figure 3:
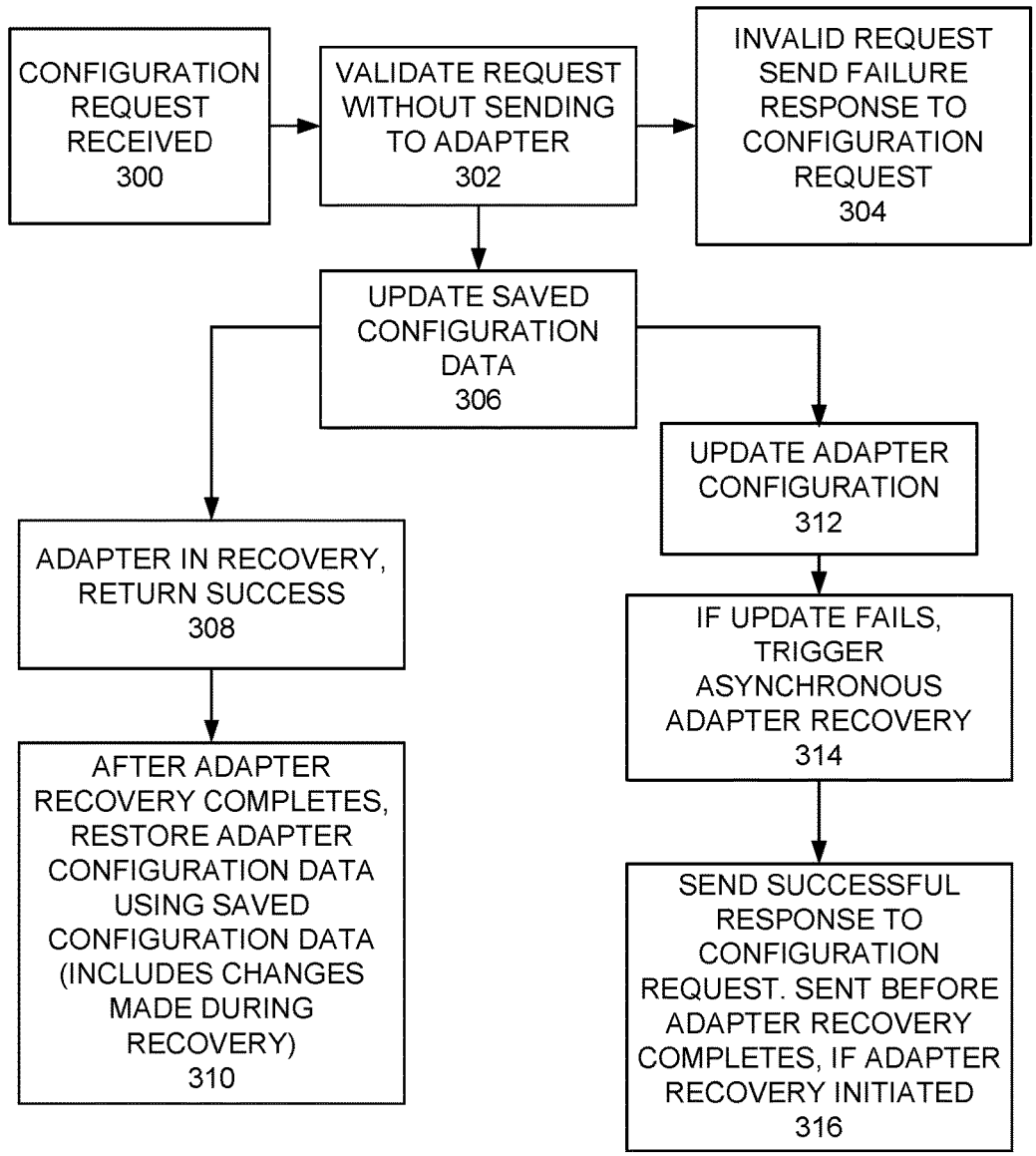
FIG. 3 is a flow chart illustrating exemplary operations for implementing concurrent shared adapter configuration updates with maintenance actions for the SRIOV adapter in accordance with the preferred embodiment.

Referring to FIG. 3, there are shown exemplary operations of the processing and logic provided by the hypervisor 130 for implementing concurrent shared adapter configuration updates with maintenance actions in accordance with the preferred embodiment.

In FIG. 3, as indicated in a block 300, the adapter driver starts with a configuration request is received. The configuration request is validated without sending to the adapter as indicated in a block 302. With an invalid request, a failure response is sent to the configuration request as indicated in a block 304. Otherwise, the saved configuration data is updated as indicated in a block 306.

When the adapter is in recovery after the configuration data is updated, success is returned as indicated in a block 308. As indicated in a block 310, once error recovery completes the updated configuration information is pushed to the adapter. This represents the prior configuration as modified by any configuration changes which have been made during the recovery process. The new resource is then available for use, just as if it had been configured while the adapter was not in error recovery.

In accordance with features of the invention, one subtlety is that adapter failures which occur during configuration change requests must be handled carefully. Ordinarily, a command failing to the adapter will result in a failure propagating back to the original request. However, that may not be appropriate for a failure of a configuration request. It must be recognized that the failure is part of a configuration request that would ordinarily have succeeded. The failure then must initiate error recovery, since the adapter must be reinitialized or recovered, but yet the failing command be translated back to a successful completion of the configuration request.

After the saved configuration data is updated, then the adapter configuration is updated as indicated in a block 312. If the adapter configuration fails, an asynchronous adapter recovery is triggered as indicated in a block 314. When the adapter is in recovery after the configuration data is updated and the adapter configuration fails, success is returned before the adapter recovery completes if the adapter recovery is initiated, as indicated in a block 314.

Figure 4:
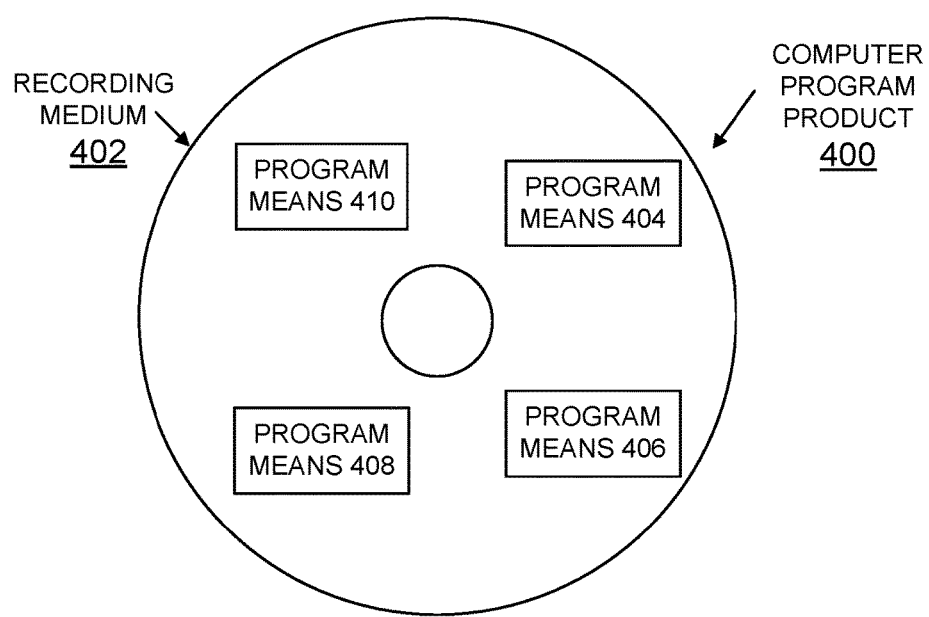
FIG. 4 is a block diagram illustrating a computer program product in accordance with the preferred embodiment.

Referring now to FIG. 4, an article of manufacture or a computer program product 400 of the invention is illustrated. The computer program product 400 is tangibly embodied on a non-transitory computer readable storage medium that includes a recording medium 402, such as, a floppy disk, a high capacity read only memory in the form of an optically read compact disk or CD-ROM, a tape, or another similar computer program product. Recording medium 402 stores program means 404, 406, 408, and 410 on the medium 402 for carrying out the methods for implementing concurrent shared adapter configuration updates with maintenance actions for a Single Root Input/Output Virtualization (SRIOV) adapter of a preferred embodiment in the system 100 of FIG. 1, or system 200 of FIG. 2.

A sequence of program instructions or a logical assembly of one or more interrelated modules defined by the recorded program means 404, 406, 408, and 410, direct the computer system 400 for implementing concurrent shared adapter configuration updates with maintenance actions for a Single Root Input/Output Virtualization (SRIOV) adapter of a preferred embodiment.

While the present invention has been described with reference to the details of the embodiments of the invention shown in the drawing, these details are not intended to limit the scope of the invention as claimed in the appended claims.

What is claimed is:

1. A method for implementing concurrent shared adapter configuration updates with maintenance actions for an input/output (I/O) adapter in a computer system, said method comprising:
   decoupling configuration of the adapter from a saved configuration state of the adapter during a recovery period;
   responsive to receiving a configuration request during execution of an error recovery sequence, validating the received configuration request including a system hypervisor validating the received configuration request;
   responsive to identifying a valid received configuration request, updating the saved configuration state;
   responsive to updating the saved configuration state and the adapter being in the error recovery sequence, returning success to the configuration request;
   responsive to the adapter completing the error recovery sequence, restoring the adapter to the updated saved configuration state; and
   responsive to the updated saved configuration state, updating the adapter configuration providing the updated configuration available for use.

2. The method as recited in claim 1, wherein the I/O adapter includes a Single Root Input/Output Virtualization (SRIOV) adapter.

3. The method as recited in claim 1, wherein responsive to receiving a configuration request during the execution of an error recovery sequence, validating the received configuration request includes validating the received configuration request without sending the received configuration request to the I/O adapter.

4. The method as recited in claim 3, includes responsive to an invalid request, sending a failure response to the configuration request.

5. The method as recited in claim 1, includes responsive to updating the saved configuration state, updating the adapter configuration.

6. The method as recited in claim 1, includes a hardware management console (HMC) sending the configuration request to said system hypervisor.

7. The method as recited in claim 1, includes said system hypervisor sending a failure response to the configuration request responsive to an invalid request.

8. A system for implementing concurrent shared adapter configuration updates with maintenance actions for an input/output (I/O) adapter in a computer system comprising:
   a hardware processor;
   a system hypervisor managing functions associated with the I/O adapter;
   said hardware processor including said system hypervisor to perform the steps of:
   decoupling configuration of the adapter from a saved configuration state of the adapter during a recovery period;
   responsive to receiving a configuration request during the execution of an error recovery sequence, validating the received configuration request;
   responsive to identifying a valid received configuration request, updating the saved configuration state;
   responsive to updating the saved configuration state and the adapter being in the error recovery sequence, returning success to the configuration request;
   responsive to the adapter completing the error recovery sequence, restoring the adapter to the updated saved configuration state; and
   responsive to the saved configuration state, updating the adapter configuration providing the updated configuration available for use.

9. The system as recited in claim 8, wherein the I/O adapter includes a Single Root Input/Output Virtualization (SRIOV) adapter.

10. The system as recited in claim 8, wherein responsive to receiving a configuration request during the execution of an error recovery sequence, validating the received configuration request includes validating the received configuration request without sending the received configuration request to the I/O adapter.

11. The system as recited in claim 10, includes responsive to an invalid request, sending a failure response to the configuration request.

12. The system as recited in claim 8, includes responsive to updating the saved configuration state, updating the adapter configuration.

13. The system as recited in claim 8, includes a hardware management console (HMC) sending the configuration request to said system hypervisor, and includes said system hypervisor sending a failure response to the configuration request responsive to an invalid request.

* * * * *